United States Patent Office 2,991,236
Patented July 4, 1961

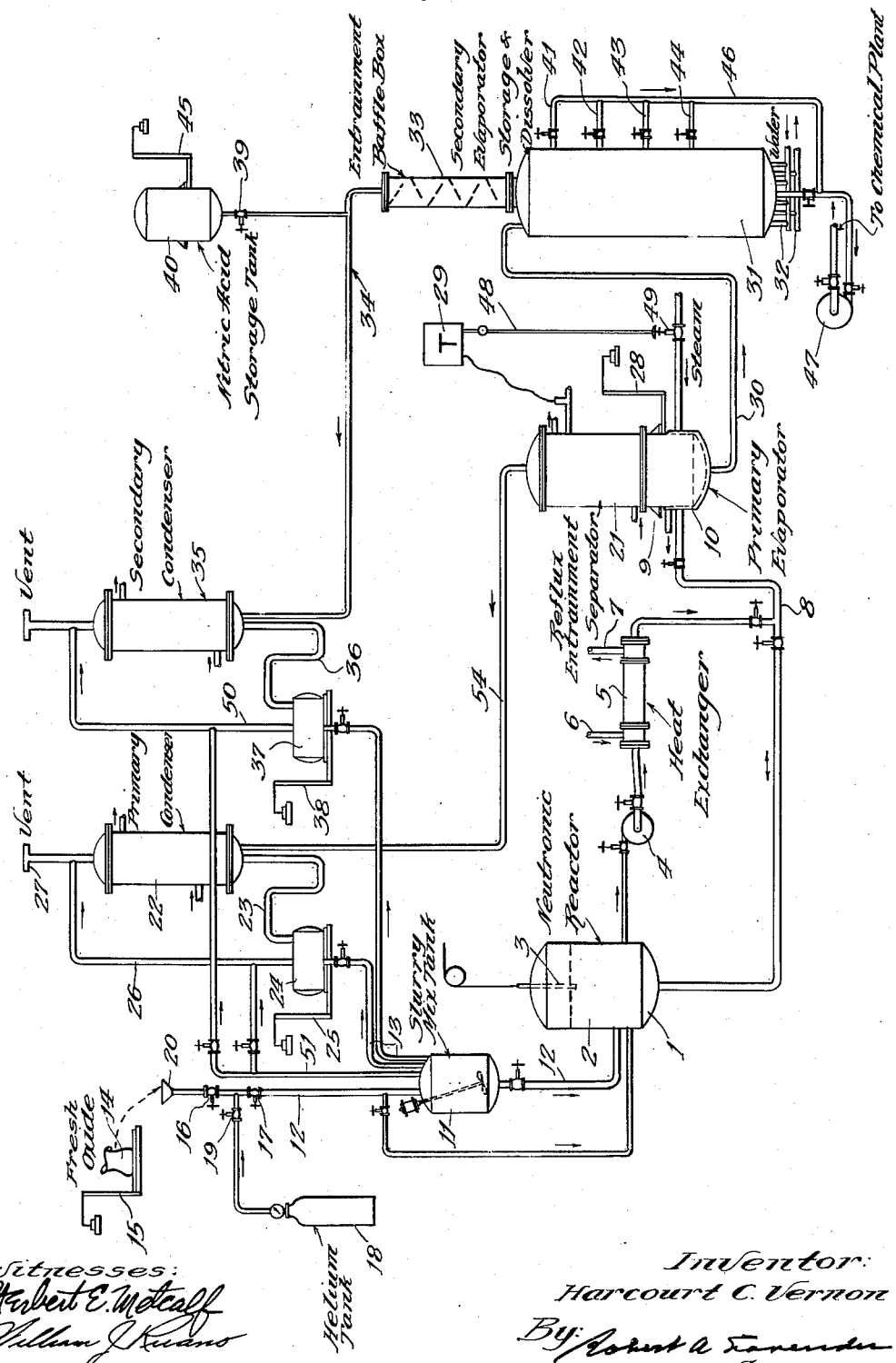

2,991,236
SEPARATING LIQUID MODERATOR FROM A SLURRY TYPE REACTOR
Harcourt C. Vernon, Oak Ridge, Tenn., assignor to the United States of America as represented by the United States Atomic Energy Commission
Filed Apr. 18, 1945, Ser. No. 588,985
4 Claims. (Cl. 204—154.2)

The present invention relates to treatment of a solution, slurry or other dispersion of fissionable material which is suspended in a liquid neutron slowing material or moderator, and may be used in the production of the transuranic element $94^{239}$, or similar isotope, by neutrons released by the nuclear chain reaction of uranium with slow neutrons in the suspension itself. More specifically, my invention relates to an apparatus and method for the separation of the liquid moderator from a neutron irradiated slurry or suspension to recover element $94^{239}$ therefrom.

Natural uranium contains the isotopes $92^{238}$ and $92^{235}$ in the ratio of approximately 139 to 1, and hereinafter in the specification and the claims the term uranium is to be understood as referring to uranium and its chemical compositions, of normal isotopic content, unless otherwise indicated by the context.

In a self-sustaining chain reaction of natural uranium with slow neutrons, $92^{238}$ is converted by neutron capture to the uranium isotope $92^{239}$. The latter in turn is converted by beta decay to $93^{239}$ and this $93^{239}$ in turn is converted by beta decay to the transuranic element $94^{239}$. By thermal neutron capture, $92^{235}$ on the other hand, undergoes nuclear fission, releasing energy appearing as heat, gamma and beta radiation, and forming fission fragments appearing as radioactive isotopes of lower mass numbers, as well as releasing secondary neutrons.

The secondary neutrons thus produced by the fissioning of the $92^{235}$ nuclei have a high average energy, and must be slowed down to thermal energies in order to be in condition to cause fission in new $92^{235}$ nuclei. Some of the secondary neutrons are absorbed by uranium leading to the production of $94^{239}$, others are lost either by absorption in other materials forming in the reactor, or by leakage from the system. Nevertheless, enough may remain to sustain the chain reaction in a system of sufficient size that is properly designed to minimize these losses. Based upon the relative concentrations of $92^{235}$ and $92^{238}$ and their relative absorption for neutrons, over half of the remaining neutrons will be absorbed in $92^{235}$ to cause fission and most of those left will be absorbed by $92^{238}$ leading to the formation of $94^{239}$.

Under these conditions, the chain reaction will not only supply the neutrons necessary for a self-sustaining neutronic reaction, but will also supply neutrons for capture by the isotope $92^{238}$ leading to the production of $94^{239}$.

As $94^{239}$ is a transuranic element, it can be separated from the unconverted uranium by chemical methods, and as it is fissionable in a manner similar to the isotope $92^{235}$, is valuable for enriching natural uranium for use in other chain reacting systems of smaller overall size. Furthermore the fission fragments are useful in the field of medicine, being efficient biological tracer elements, as they are radioactive.

The neutron chain reaction referred to, can be made self-sustaining in a device known as a neutronic reactor wherein uranium bodies are dispersed in an efficient neutron slowing medium or moderator, when the reactor is made to be somewhat larger than critical size, that is, the size whereby the rate of neutron generation inside the reactor is equal to the rate of neutron consumption in the interior of and loss from the exterior of the reactor. Thus a self-sustaining neutron chain reaction may be established in a deuterium oxide slurry of a natural uranium compound such as $UO_2$ or $UO_3$ with an average particle size of about one micron which contains about 0.2 gram of uranium per milliliter of slurry. Using such a slurry about 30–40 metric tons of deuterium oxide and about 6 metric tons of uranium as $UO_2$ are capable of sustaining a neutron chain reaction in a spherical reactor. Moreover, solutions of uranyl fluoride in deuterium oxide may be used for this purpose.

A similar neutron reaction may be established using other fissionable materials and their corresponding compounds. For example, mixtures of $U^{238}$ with $U^{233}$ or $U^{235}$ or $94^{239}$ will sustain such a chain reaction provided the concentration of the $U^{233}$ or $94^{239}$ is approximately equal to or greater than the $U^{235}$ concentration in natural uranium. Moreover, $U^{233}$, $U^{235}$ or $94^{239}$ may be used alone to carry on a neutron chain reaction or enriched compositions containing 5, 10 or more percent of these isotopes may be used for this purpose.

For example, a neutron chain reaction may be established and maintained using a solution of a uranium salt such as uranyl nitrate or uranyl sulphate in water provided the concentration of $U^{235}$ or similar isotope is sufficiently high.

An object of the present invention is to provide a new and effective method for separating the liquid moderator from a suspension, solution or other dispersion of fissionable material in the moderator.

In accordance with the present invention it has been found that an effective separation of a moderator such as deuterium oxide (heavy water) from a neutron irradiated slurry may be effected by vaporizing the moderator using the heat developed from radioactive decay of the radioactive products produced by the neutron bombardment. In conducting this operation the evaporator becomes radioactive and is therefore difficult to repair or clean. To minimize this difficulty it is preferred to conduct this vaporization in at least two stages to minimize problems due to radioactivity of the materials. Thus it has been found that if the suspension is retained in a primary evaporator for a short time until delayed neutron emission has substantially ceased, the solution may be transferred to a second evaporator where the major portion of the vaporization is conducted and the second evaporator does not become excessively radioactive. Moreover cleaning of the primary evaporator which is radioactive is not required or is required infrequently. In addition less moderator is required since the moderator recovered in the first stage may be removed and returned to the reactor system within a short time while removal of the remainder of the moderator from the radioactive solid is proceeding.

Other objects and advantages will become more apparent from the following description taken together with the drawing in which:

FIG. 1 is a schematic diagram showing one form of apparatus for effecting separation of heavy water from a neutron reacting slurry in accordance with the present invention.

It should be noted that substantially all the parts illustrated in FIG. 1 would, in practice, be surrounded by a suitable shield, such as, for example, lead, concrete or the like, to protect operating personnel from the effects of penetrating radiations such as neutrons and gamma rays emitted by the irradiated particles of the neutronic slurry. Such shields have been omitted from the drawing, however, in the interests of clarity. Shields such as those described in application of Enrico Fermi and Leo Szilard, Serial No. 568,904, filed December 19, 1944, now Patent 2,708,656, are suitable.

Referring to the drawing, numeral 1 denotes a container or neutronic reactor tank within which the neutronic reaction is caused to occur and that is partially filled with a solution or slurry 2 of uranium oxide or other suitable fissionable material. Where a slurry is used the size of the particles is preferably below 2 microns to reduce erosion in pumps and other parts of the system, and to reduce poisoning of the system by iron particles and other neutron absorbing materials otherwise abraded from internal surfaces forming the system. One or more rods 3 of neutron absorbing material such as, for example, cadmium may be dipped into and out of the slurry 2 by any suitable control means (not shown) either manual, or automatically responsive to neutron density as denoted by an ion chamber of any well-known type located near the periphery of the neutronic reactor tank 1 to control the neutron density and neutron reproduction ratio of the system by absorbing sufficient neutrons from the chain to control the reproduction ratio in the reactor and while operating to maintain that ratio at an average of unity. As an emergency means for stopping the chain reaction, the slurry 2 may be dumped into any suitable reservoir at a lower elevation, such as primary evaporator 9 positioned at a lower elevation than tank 1. Slurry 2 may be pumped through a circulating system by use of a pump or other circulating means 4 for the purpose of cooling the slurry. The circulating system is provided with a suitable cooling means; such as, for example, a heat exchanger 5, in which cooling water may be made to flow as shown by the inlet 6 and outlet 7. Outlet piping 8 is provided for the purpose of withdrawing the slurry from tank 1 and conducting it to a primary evaporator 9. The evaporator 9 may be provided with a heater or steam jacket 10 for aiding the quick evaporation of a large part of the heavy water.

After the contents of tank 1 are allowed to flow into primary evaporator 9, the tank 1 may be refilled by fresh slurry stored in a slurry mix tank 11 into which is fed uranium oxide particles, through the oxide inlet pipe 12, and heavy water, through heavy water inlet pipes 13. Numeral 14 denotes a supply of fresh uranium oxide, portions of which may be weighed by a scale schematically indicated by numeral 15. In order to avoid escape of helium from the reactor, as will be described more fully hereinafter, a pair of valves 16 and 17 are provided in the oxide inlet pipe 12. A supply of helium, such as contained in a pressure tank 18, may be introduced by opening valve 19.

More specifically, when it is desired to introduce a fresh charge of uranium oxide, valve 16 is opened and valves 17 and 19 are closed and the oxide is then introduced through a funnel 20 to fill the portion of pipe 12 located above valve 17. After this portion is filled, valve 16 is closed and valve 19 opened so as to build up sufficient helium pressure from tank 18 so that upon subsequent opening of valve 17 the uranium oxide particles will be forced downwardly and will prevent any back-up of irradiated helium derived from the top of the slurry mix tank 11, collected from the remainder of the separation system. Normally the top of tank 1 is charged with helium gas. Helium is inert and has low absorption for neutrons.

After the contents of tank 1 are allowed to flow into the primary evaporator 9, the heat derived from steam jacket 10, as well as the self heat developed by the radioactive gamma and beta decay of the irradiated oxide particles will cause evaporation of the heavy water. Complete evaporation in this primary evaporation is undesirable since the radioactivity of the evaporator makes cleaning difficult. However it is not unusual to evaporate as much as 80 percent of the heavy water in evaporator 9 to reduce the holdup of heavy water. Moreover it is desirable to conduct the preliminary evaporation at a rapid rate so that moderator may be returned to the reactor within a short time. The secondary evaporation can proceed at a much slower rate to permit an efficient and substantially complete removal of residual $D_2O$. In the primary evaporator the vaporized heavy water will first pass through a reflux entrainment separator 21. This separator is in effect, a condenser for refluxing the vaporized medium so as to more effectively separate the heavy water from the uranium oxide particles. The vaporized heavy water will travel through separator 21 and piping 54 and will be condensed in the primary condenser 22. After condensation, the heavy water will be conducted through pipe 23 to a primary return weighing tank 24, disposed on a scale 25. A vent pipe 26 is provided to inter-connect the top portion of the tank 24 and primary condenser 22 to equalize their pressures and allow gravity flow of heavy water from condenser 22 to tank 24 at a lower elevation. An additional vent pipe 27 may be opened to the atmosphere. A weighing scale 28 may also be provided for primary evaporator 9 for the purpose of determining the amount of heavy water evaporated as well as the amount of slurry introduced. A temperature indicating instrument of any well-known type, denoted schematically by block diagram 29 is provided to indicate the temperature of the vaporized heavy water at the outlet of the reflux entrainment separator 21 and to control the flow of steam accordingly, through an air line 48 connected to the pressure controlled valve 49. It should be noted that if desired, the heater or steam jacket 10 on the primary evaporator 9 may be omitted, and the vaporization may be effected entirely by the self heat developed by the radioactive or beta decay of the uranium. However, since this may take an appreciable length of time to build up in slurries irradiated at low rates, it may be desirable to speed the evaporating process by adding the external heating steam jacket 10 as described.

During the time the suspension remains in the primary evaporator a substantial portion of the radioactive decay of the isotopes of short half-life takes place. The partial evaporation in the primary reactor preferably is conducted at a relatively rapid rate, for example 5 to 10 minutes, to permit rapid return of a portion of the moderator to the system. In general, however, the time of preliminary evaporation is of such duration that emission of delayed neutrons is substantially over before the preliminary evaporation has been completed. Therefore, the secondary evaporator will not be subjected to the action of delayed neutrons nor to the intense radioactivity of short life fission products and the materials of this evaporator will not become radioactive by neutron absorption and will, for this reason, be accessible when empty and clean for repairs or the like. This is generally not the case for the primary evaporator, inasmuch as the walls of the primary evaporator become radioactive when bombarded by the delayed neutrons. Consequently even when empty and clean, this induced radio-activity must be allowed to decay for several months before the evaporator can be safely approached by operating personnel.

The heavy water, as a result of the above-described process, undergoes a purification by distillation that removes non-volatile products of corrosion or fission that might otherwise interfere with the operation of the neutronic reactor when the water is returned thereto.

The remaining concentrate which may be a more concentrated solution or slurry or a relatively thick sludge contained in primary evaporator 9 is then passed on through pipe 30 to a secondary evaporator 31, where the final evaporation is conducted preferably at a rate somewhat slower than the preliminary evaporation in order to ensure substantially complete removal of the moderator from the solids. This evaporator is cooled both internally and externally by coils 32 through which cooling water or other suitable coolant is conducted. A suitable pump (not shown) may be used to effect this transfer. Where heavy water is the liquid undergoing vaporization an ideal consistency for the concentrate before introduction into secondary evaporator 31 is one that is only sufficiently fluid so that it will be able to flow through pipe 30, because if a greater amount of heavy water is retained in the concentrate an appreciable hold-up will be introduced into the system. On the other hand, more fluid dispersions are suitable with less expensive liquids such as ordinary water.

It will be noted that the means for vaporizing the remaining heavy water contained in the concentrate introduced into secondary evaporator 31 is the heat developed by the remaining radioactive or beta decay. In fact, this heat may become intense as to require special cooling coils 32 to keep the temperature at a satisfactory operating value and to prevent local overheating particularly since a relatively small amount of heavy water is present in the final stages of vaporization. An entrainment baffle box 33 is provided immediately above evaporator 31 to catch, by means of its baffles, most of the uranium oxide particles that are contained in the vapor mixture to provide better separation of the heavy water from the uranium oxide particles. The vaporized heavy water flows through piping 34 into a secondary condenser 35. After condensation of the heavy water within such secondary condenser 35, the heavy water will be conducted through pipe 36 to a secondary return weighting tank 37. A scale 38 is provided for weighing the amount of heavy water returned. Both the primary and secondary tanks 24 and 37, respectively, act as reservoirs for supplying fresh heavy water to the slurry mix tank 11 through pipes 13. Piping 50 is provided to equalize the pressures at the top of condenser and tank 37 to allow gravity flow to the latter. Piping 51 equalizes these pressures with the pressure at the top of tank 11.

It will be noted that the secondary evaporator 31 has a dual function namely, as an evaporator and a storage or dissolving tank into which a supply of nitric acid or other solvent for dissolving the uranium oxide particles may be introduced. By opening valve 39 a supply of nitric acid from storage tank 40 may be introduced into the evaporator 31 so as to dissolve the residue of dry uranium oxide particles formed as a result of evaporation. A plurality of outlet pipes 41, 42, 43 and 44 are provided, each having a suitable valve, so that the solution formed at the top of evaporator may be partially drawn off before a fresh supply of acid is introduced. A scale 45 may be provided to determine the amount of nitric acid introduced from tank 40. The solution formed in secondary tank 31 is then conducted through pipe 46, by means of centrifugal pump 47, to a chemical separating plant (not shown) of any suitable type, to effect ultimate separation of $94^{239}$ formed as a result of the neutron irradiation.

It will be seen, therefore, that I have provided an efficient means for separating heavy water from an irradiated slurry, such as one obtained from irradiation in a neutronic reactor, that makes efficient use of the heat developed as the result of radioactive decay of the irradiated fissionable particles, and that considerably reduces hold-up of heavy water by immediately returning a substantial fraction to the reaction. This system also introduces a certain hold-up or delay of flow of the slurry to allow slow neutron emission and a predetermined amount of radioactive decay to be completed before introduction of the remaining concentrate into the secondary evaporator; and in which the secondary evaporator also functions as a chemical dissolving tank.

It should be noted that while I have described uranium oxide particles as constituting the fissionable material in the slurry, that other fissionable material may be used instead, without departing from the spirit of the invention, such as, for example, bismuth uranate ($Bi_2O_3 \cdot UO_3$). Furthermore, liquid moderators, other than heavy water may be used instead such as, for example, light water when more than the normal amount of fissionable material is incorporated in the uranium. It will also be noted that duplicate or multiple systems similar to that described may be used.

The process is applicable to use with various dispersions using various vaporizable moderators. Thus with enriched compositions ordinary or light water may be used as a moderator. Moreover, deutero carbons, such as, deuterobenzene or deuterodiphenyl may be used.

Moreover, it should be noted that the process is applicable to slurries or suspensions which have been subjected to neutron bombardment in other ways. For example, a solution or suspension of uranium, thorium or other element capable of yielding a radioactive isotope under neutron bombardment may be subjected to bombardment by a source of neutrons, for example, another neutron chain reacting mass and the solvent or liquid removed as herein described. The reactors described in Patent No. 2,708,650 issued to Fermi and Szilard, referred to above, constitute suitable neutron sources. Likewise, other modifications will be apparent to those skilled in the art as a result of the teachings of my invention. For this reason, the invention should not be restricted except insofar as set forth in the following claims.

I claim:

1. A method of recovering the liquid moderator and the other components of the core of a nuclear reactor of the fluid core type, comprising leading the fluid contents of the core immediately after a period of operation out of the reactor vessel through a conduit into a preheated first evaporator which will cause the moderator immediately to begin to evaporate, retaining the said contents in said first evaporator under continued heating for a sufficient time to cause a major portion of the moderator to evaporate from the first evaporator while retaining a sufficient minor portion to keep the remainder of said contents in a fluid condition, said time being longer than the period of delayed neutron emission by said contents, leading the moderator so evaporated back to the reactor vessel, then leading said remainder of said contents from said first evaporator to a second unheated evaporator having a plurality of outlet pipes at successive levels and keeping it in said second evaporator for a sufficient time to permit the heat from the radioactivity of said remainder of said contents to evaporate said minor portion of the moderator out of said second evaporator and leading it back to the reactor vessel for reuse, and then removing the resulting solids left in the second evaporator by alternately adding fresh solvent and partially withdrawing the resulting solution at the top through one of the plurality of outlet pipes until the second evaporator is substantially free from all radioactivity.

2. The method of claim 1 where the solvent is aqueous nitric acid.

3. The method of claim 1 where the moderator is $D_2O$.

4. The method of claim 1 where the reactor is of the slurry type.

References Cited in the file of this patent

UNITED STATES PATENTS

| | | |
|---|---|---|
| 1,232,839 | Phillips | July 10, 1917 |
| 1,749,455 | Wait | Mar. 4, 1930 |
| 2,206,634 | Fermi et al. | July 2, 1940 |
| 2,385,955 | Thomlinson | Oct. 2, 1945 |
| 2,708,656 | Fermi et al. | May 17, 1955 |

FOREIGN PATENTS

| | | |
|---|---|---|
| 129,873 | Great Britain | July 24, 1919 |
| 114,150 | Australia | May 2, 1940 |
| 114,151 | Australia | May 3, 1940 |
| 233,011 | Switzerland | Oct. 2, 1944 |

OTHER REFERENCES

Pollard and Davidson: "Applied Nuclear Physics," pages 107–8, John Wiley and Sons, Inc. (1942).